(12) United States Patent
Chuang et al.

(10) Patent No.: US 9,223,356 B2
(45) Date of Patent: Dec. 29, 2015

(54) ELECTRONIC DEVICE

(71) Applicants: Po-Feng Chuang, Taipei (TW); Yu-Hsuan Ku, Taipei (TW); Shih-Huei Liu, Taipei (TW); Ming-Wang Lin, Taipei (TW)

(72) Inventors: Po-Feng Chuang, Taipei (TW); Yu-Hsuan Ku, Taipei (TW); Shih-Huei Liu, Taipei (TW); Ming-Wang Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 113 days.

(21) Appl. No.: 14/017,327

(22) Filed: Sep. 4, 2013

(65) Prior Publication Data

US 2014/0126126 A1    May 8, 2014

Related U.S. Application Data

(60) Provisional application No. 61/723,294, filed on Nov. 6, 2012.

(51) Int. Cl.
*G06F 1/16* (2006.01)
(52) U.S. Cl.
CPC ............ *G06F 1/1679* (2013.01); *G06F 1/1626* (2013.01); *G06F 1/1632* (2013.01); *G06F 1/1654* (2013.01)

(58) Field of Classification Search
CPC .................................................... G06F 1/1679
See application file for complete search history.

(56) References Cited

U.S. PATENT DOCUMENTS

| | | | | |
|---|---|---|---|---|
| 5,796,576 A | * | 8/1998 | Kim | 361/679.28 |
| 6,512,670 B1 | * | 1/2003 | Boehme et al. | 361/679.29 |
| 6,530,784 B1 | * | 3/2003 | Yim et al. | 439/31 |
| 7,025,274 B2 | * | 4/2006 | Solomon et al. | 235/472.01 |
| 7,599,178 B2 | * | 10/2009 | Huang et al. | 361/679.43 |
| 7,692,919 B2 | * | 4/2010 | Liang et al. | 361/679.29 |
| 8,238,085 B2 | * | 8/2012 | Wu et al. | 361/679.17 |
| 8,547,696 B2 | * | 10/2013 | Lin | 361/679.58 |
| 8,817,456 B2 | * | 8/2014 | Lin et al. | 361/679.29 |
| 9,013,868 B2 | * | 4/2015 | Kuo et al. | 361/679.43 |

FOREIGN PATENT DOCUMENTS

| | | |
|---|---|---|
| TW | 411751 | 11/2000 |
| TW | 201310206 | 3/2013 |

* cited by examiner

*Primary Examiner* — Anthony Q Edwards
(74) *Attorney, Agent, or Firm* — Jianq Chyun IP Office

(57) ABSTRACT

An electronic device includes a first body and a second body. The first body has a lock portion. The second body includes a main body, a lock component, an actuator and a retainer. The main body is configured to be detachably assembled to the first body. The lock component is movably disposed in the main body. The actuator is disposed in the main body. The retainer is connected to the actuator, in which when the main body is detachably assembled to the first body and the lock component is located at a first position, the lock component locks the lock portion to prevent the main body being separated from the first body, and the actuator is configured to drive the retainer pushing the lock component so as to prevent the lock component departing from the first position.

9 Claims, 6 Drawing Sheets

ELECTRONIC DEVICE

CROSS-REFERENCE TO RELATED APPLICATION

This application claims the priority benefits of U.S. provisional application Ser. No. 61/723,294, filed on Nov. 6, 2012. The entirety of the above-mentioned patent application is hereby incorporated by reference herein and made a part of this specification.

BACKGROUND OF THE INVENTION

1. Field of the Invention

The invention generally relates to an electronic device, and more particularly, to an electronic device with a detachable body.

2. Description of Related Art

Along with the developments of science and technology, many portable electronic devices are lunched on the market, such as smart phone and tablet PC. These portable electronic devices not only make people's live convenient, but also serve as an indispensible portable device.

Taking a tablet PC as an example, due to its thinner and lighter design, the tablet PC gets welcome for the users to carry. In addition, the tablet PC is configured to be detachably assembled to a docking station to extend its function. When a tablet PC, for example, is detachably assembled to a docking station with a keyboard, the user is able to manipulate the tablet PC through the keyboard. On the other hand, some tablet PCs employ lock components therein to make the tablet PCs locked at the docking station, and at the time, to facilitate detaching from the docking station, the lock components are movable by design. However, a movable lock component is easily to be released from the docking station due to an external force, which causes the tablet PC unexpectedly separated from the docking station and makes inconvenience with usage.

SUMMARY OF THE INVENTION

Accordingly, the invention is directed to an electronic device able to be firmly fixed.

An electronic device of the invention includes a first body and a second body. The first body has a lock portion. The second body includes a main body, a lock component, an actuator and a retainer. The main body is configured to be detachably assembled to the first body. The lock component is movably disposed in the main body. The actuator is disposed in the main body. The retainer is connected to the actuator, in which when the main body is detachably assembled to the first body and the lock component is located at a first position, the lock component locks the lock portion to prevent the main body being separated from the first body, and the actuator is configured to drive the retainer pushing the lock component so as to prevent the lock component departing from the first position.

In an embodiment of the invention, the second body further includes an elastic component connected between the main body and the lock component, and the lock component is configured to be positioned at the first position through an elastic force of the elastic component.

In an embodiment of the invention, when the lock component departs from the first position through withstanding the elastic force of the elastic component, the lock component releases the lock portion and the main body is suitable to be detached from the first body.

In an embodiment of the invention, the retainer is configured to push a first surface of the lock component to prevent the lock component departing from the first position, and the actuator is configured to drive the retainer departing from the first surface of the lock component and pushing a second surface of the lock component so as to bring the lock component moving to a second position to release the lock portion.

In an embodiment of the invention, the lock component has an opening, and the first surface and the second surface are respectively located at opposite two inner-walls of the opening.

In an embodiment of the invention, the retainer has a protrusion portion, and the protrusion portion is located in the opening to be adapted to push the first surface or the second surface.

In an embodiment of the invention, the distance between the first surface and the second surface is greater than a thickness of the protrusion portion.

In an embodiment of the invention, the actuator is a motor.

In an embodiment of the invention, the main body has a sensing component electrically connected to the actuator, and when the sensing component senses the main body is connected to the first body, the actuator drives the retainer according to a signal come from the sensing component.

Based on the depiction above, when the second body in the invention is detachably assembled to the first body, the second body not only locks the lock portion of the first body through the lock component thereof but uses the actuator to drive the retainer so as to fix the position of the lock component. In this way, the invention can avoid releasing the locking status between the lock component and the lock portion of the first body due to an external force, which enables the first body and the second body firmly joined with each other without easily getting loose.

In order to make the features and advantages of the present invention more comprehensible, the present invention is further described in detail in the following with reference to the embodiments and the accompanying drawings.

DESCRIPTION OF THE EMBODIMENTS

Figure 1:
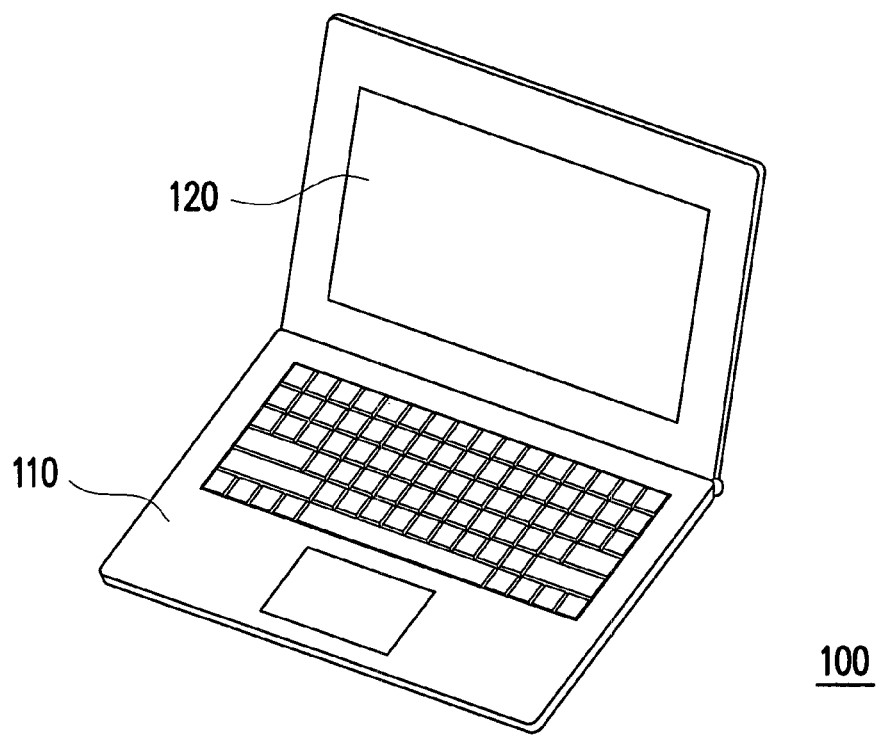
FIG. 1 is a three-dimensional diagram of an electronic device according to an embodiment of the invention.
Figure 2A:
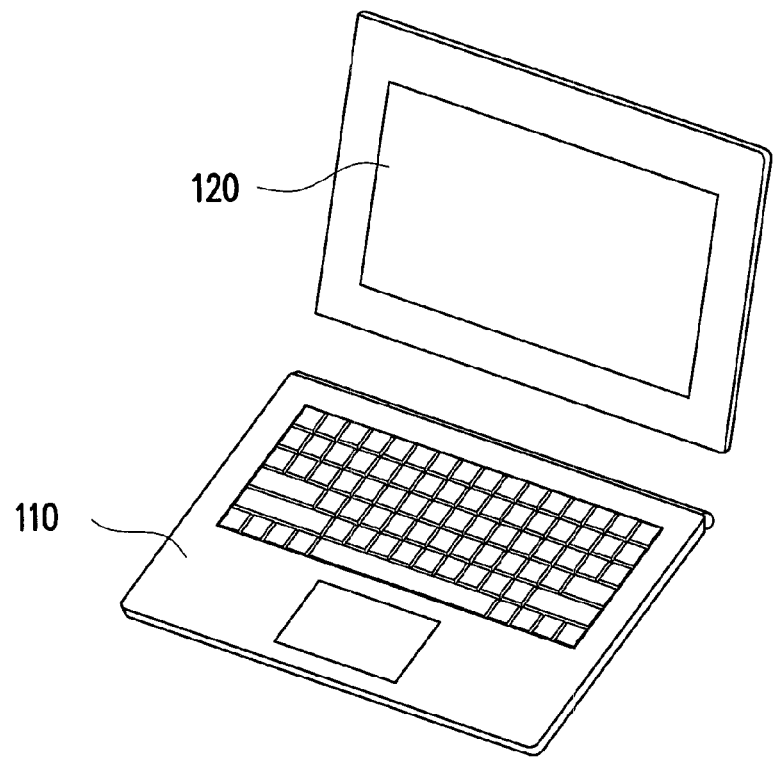
FIG. 2A is a diagram illustrating the first body and the second body of FIG. 1 are separated from each other.
Figure 2B:
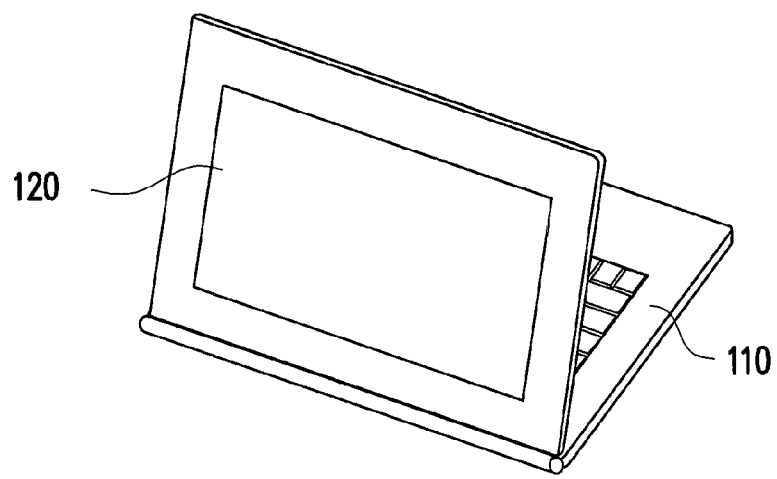
FIG. 2B is a diagram illustrating the second body of FIG. 1 is reversely assembled to the first body.

FIG. 1 is a three-dimensional diagram of an electronic device according to an embodiment of the invention, FIG. 2A is a diagram illustrating the first body and the second body of FIG. 1 are separated from each other and FIG. 2B is a diagram illustrating the second body of FIG. 1 is reversely assembled to the first body. Referring to FIGS. 1, 2A and 2B, an electronic device 100 in the embodiment includes a first body 110 and a second body 120, in which the second body 120 and the first body 110 are, for example, respectively a tablet PC and a docking station corresponding to the tablet PC. A user can make the second body 120 assembled to the first body 110 to expand the function thereof as shown by FIG. 1 or 2B, or make the second body 120 separated from the first body 110 to individually operate the second body 120 as shown in FIG. 2A.

Figure 3:
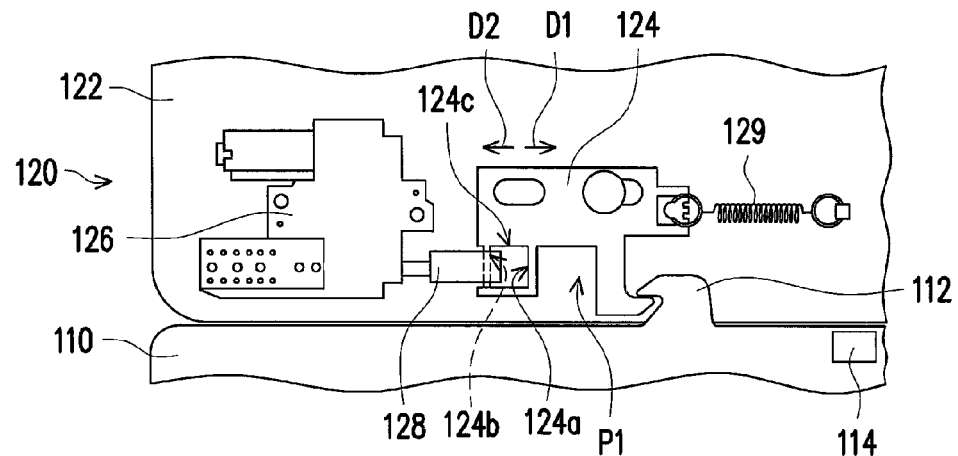
FIG. 3 is a partial structure diagram of the electronic device of FIG. 1.

FIG. 3 is a partial structure diagram of the electronic device of FIG. 1. Referring to FIG. 3, the first body 110 in the embodiment has a lock portion 112; the second body 120 includes a main body 122, a lock component 124, an actuator 126, a retainer 128 and an elastic component 129. The main body 122 is configured to be detachably assembled to the first body 110. The lock component 124 is disposed in the main body 122 movably in a direction D1 and a direction D2. The actuator 126 is, for example, a motor disposed in the main body 122. The retainer 128 is connected to the actuator 126 and suitable to be driven by the actuator 126. When the main body 122 of the second body 120 is, as shown in FIG. 3, detachably assembled to the first body 110 and the lock component 124 is located at a first position P1, the lock component 124 locks the lock portion 112 of the first body 110 to prevent the main body 122 separating from the first body 110. The elastic component 129 is, for example, a tension spring and connected between the main body 122 and the lock component 124 of the second body 120. The lock component 124 is configured to be positioned at the first position P1 through an elastic force of the elastic component 129.

Figure 4A:
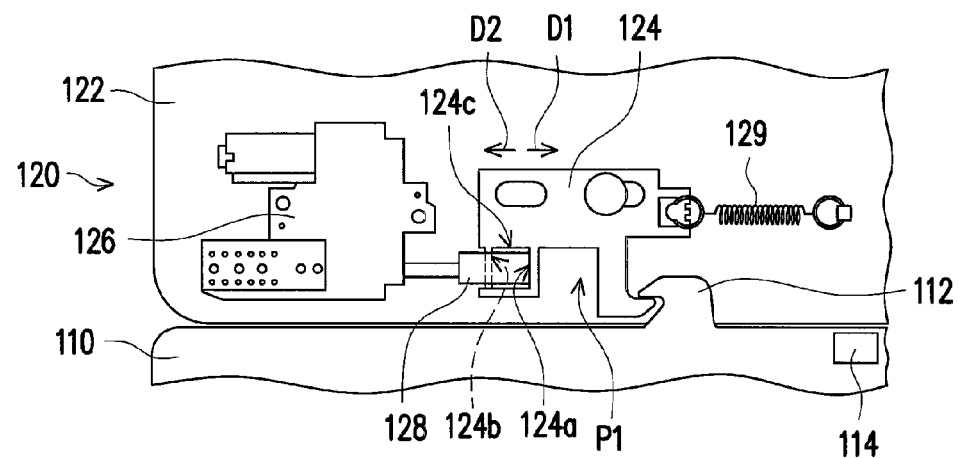
FIGS. 4A-4E are action flowchart of the lock component and the retainer in FIG. 3.

FIGS. 4A-4E are diagrams to form an action flowchart of the lock component and the retainer in FIG. 3. When the lock component 124 locks the lock portion 112 of the first body 110 as shown in FIG. 3, the actuator 126 is suitable to drive the retainer 128 pushing the first surface 124a of the lock component 124 in the direction D1 to prevent the lock component 124 departing from the first position P1, as shown in FIG. 4A. In other words, in addition to position the lock component 124 at the first position P1 by means of the elastic force of the elastic component 129, the second body 120 further uses the actuator 126 to drive the retainer 128 for fixing the position of the lock component 124, which can avoid the lock component 124 to release the locking status between the lock component 124 and the lock portion 112 of the first body 110 due to an external force, so that the first body 110 and the second body 120 can be firmly joined by each other without easily getting loose.

Figure 4B:
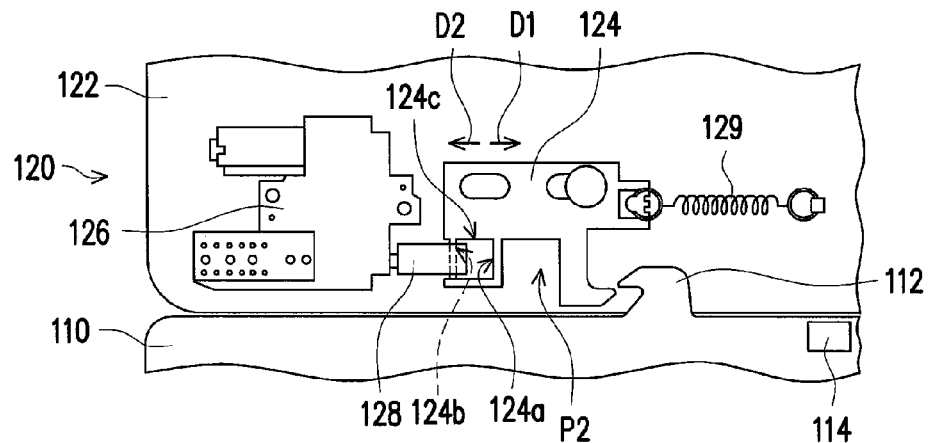
Figure 4C:
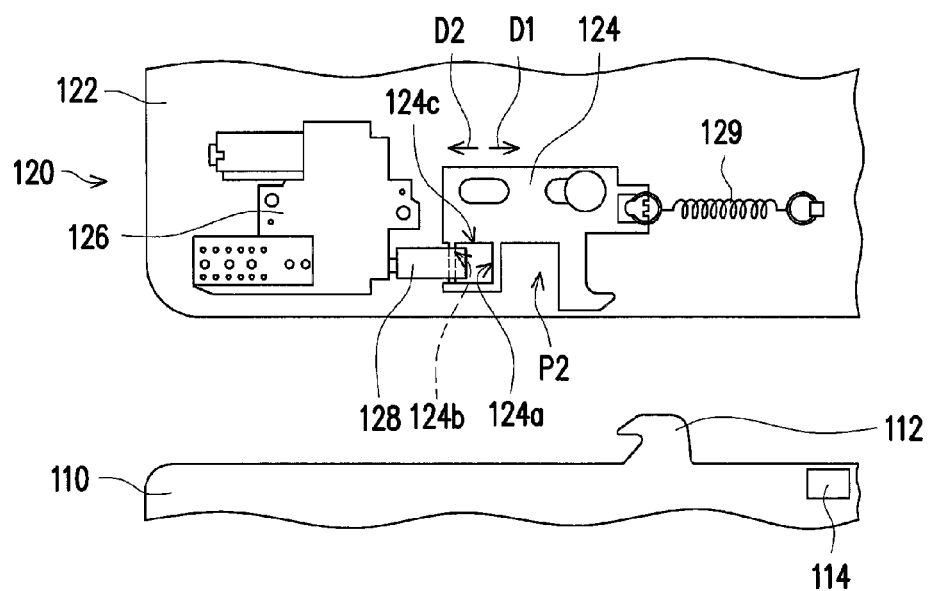

If the user is going to separate the second body 120 from the first body 110, the actuator 126 is used to drive the retainer 128 for departing from the first surface 124a of the lock component 124 and pushing a second surface 124b of the lock component 124 so as to bring the lock component 124 to withstand the elastic force of the elastic component 129 as shown in FIG. 4B. At the time, the lock component 124 moves from the first position P1 (marked in FIGS. 3 and 4A) to arrive at the second position P2. The elastic component 129 meanwhile is pulled and the lock component 124 releases the lock portion 112 of the first body 110, which makes the main body 122 of the second body 120 suitable to be detached from the first body 110 as shown in FIG. 4C. In the embodiment, for example, by pressing down a key 114 on the first body 110 to trigger the actuator 126 to drive the retainer 128 for departing from the first surface 124a of the lock component 124 as shown in FIG. 4B, which the invention is not limited to, and other suitable action can be used to trigger the actuator 126.

Figure 4D:
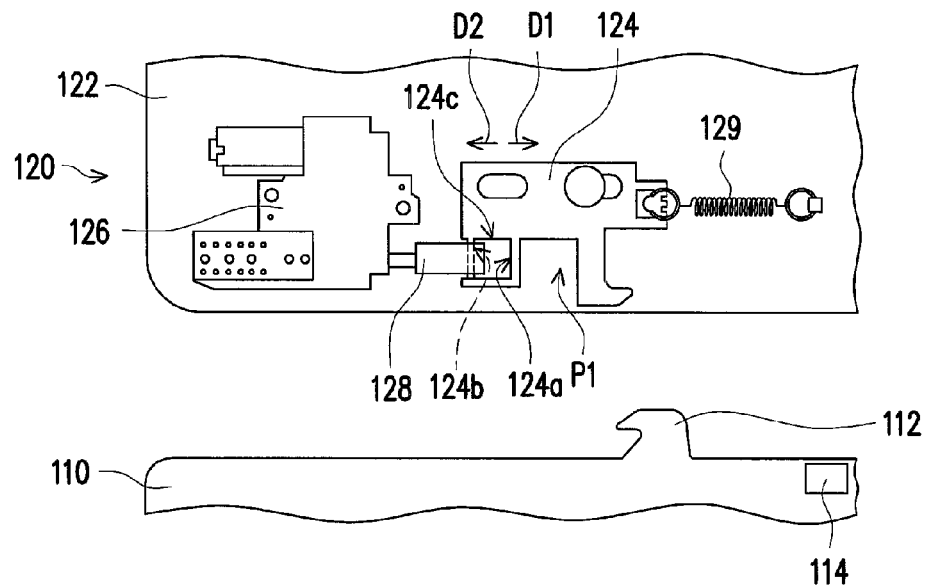

After the second body 120 is separated from the first body 110 as shown in FIG. 4C, the actuator 126 drives the retainer 128 to move in the direction D1 as shown in FIG. 4D, so that the lock component 124 is able to be reset to the first position P1 by means of the elastic force of the elastic component 129.

Figure 4E:
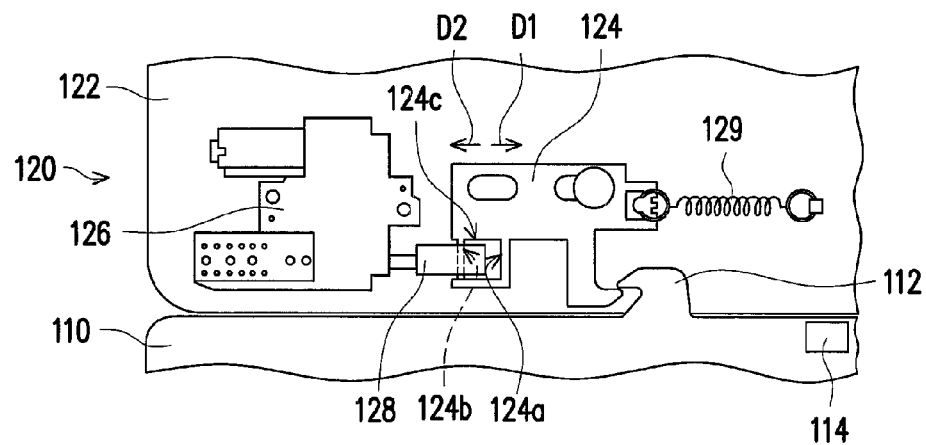

When the user makes the second body 120 joined with the first body 110 as shown in FIG. 4D, the lock component 124 at the first position P1 would push the lock portion 112 as shown in FIG. 4E to withstand the elastic force of the elastic component 129 to move in the direction D2 and to cross the lock portion 112, followed by resetting to the first position P1 in the direction D1 as shown in FIG. 3 and then locking the lock portion 112. At the time, the actuator 126 drives the retainer 128 again to move to the position as shown in FIG. 4 to fix the lock portion 112.

Figure 5:
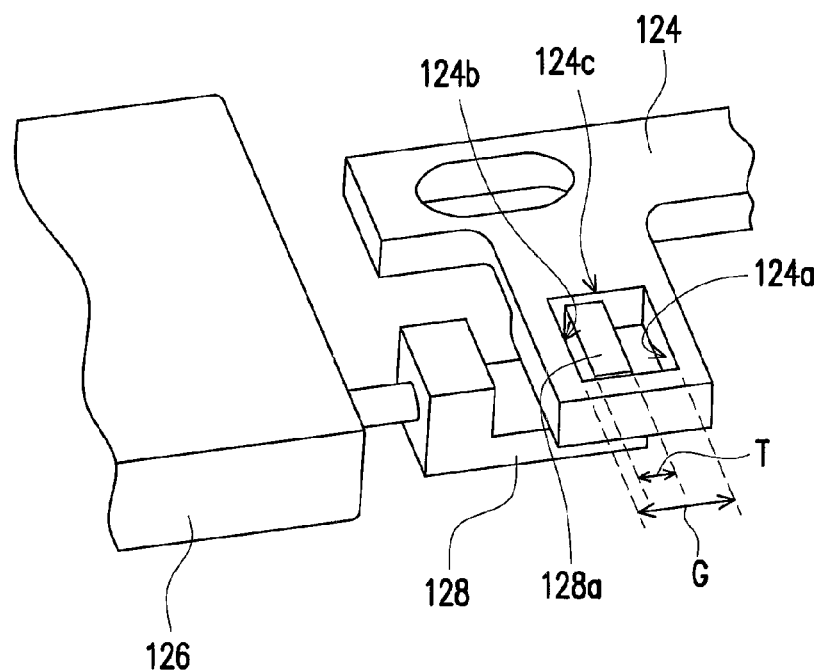
FIG. 5 is a partial three-dimensional diagram of the lock component, the actuator and the retainer of FIG. 3.

FIG. 5 is a partial three-dimensional diagram of the lock component, the actuator and the retainer of FIG. 3. Referring to FIGS. 3 and 5, in the embodiment, the lock component 124 has an opening 124c, and the first body 110 and the second body 120 are respectively located at opposite two inner-walls. The retainer 128 has a protrusion portion 128a, and the protrusion portion 128a is located in the opening 124c of the lock component 124 to be suitable for pushing the first surface 124a as shown in FIG. 4A or pushing the second surface 124b as shown in FIG. 4B.

As shown by FIG. 5, in the embodiment, a distance G between the first surface 124a and the second surface 124b of the lock component 124 is greater than the thickness T of the protrusion portion 128a of the retainer 128, so that the lock component 124, when the retainer 128 keeps unmoved, is able to move relatively to the retainer 128. In this way, when the user makes the second body 120 as shown in FIG. 4D joined with the first body 110, the lock component 124 still can smoothly move to the position shown by FIG. 4E regardless of the interference by the protrusion portion 128a of the retainer 128.

Figure 6:
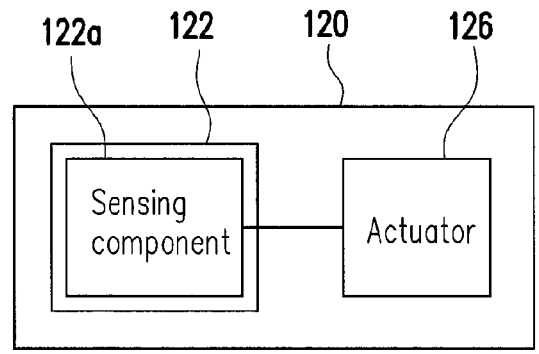
FIG. 6 is a schematic block diagram of the second body of FIG. 1.

FIG. 6 is a schematic block diagram of the second body of FIG. 1. Referring to FIG. 6, in the embodiment, the main body 122 of the second body 120 has a sensing component 122a, which is electrically connected to the actuator 126 for sensing whether or not the main body 122 is connected to the first body 110. When the second body 120, as shown in FIG. 3, is assembled to the first body 110 to make the sensing component 122a sense out the main body 122 is connected to the first body 110, the sensing component 122a sends a signal to the actuator 126 and the actuator 126 drives the retainer 128 to act as the status of FIG. 4A according to the signal come from the sensing component 122a so as to use the retainer 128 to fix the position of the lock component 124. The sensing component 122a herein is, for example, a sensing terminal disposed in a connector of the main body 122 or other sensing components in other forms, which the invention is not limited to.

In summary, when the second body in the invention is detachably assembled to the first body, the second body not only locks the lock portion of the first body through the lock component thereof but uses the elastic force of the elastic component to position the lock component. In addition, the actuator is used to drive the retainer so as to fix the position of the lock component. In this way, the invention can avoid releasing the locking status between the lock component and the lock portion of the first body due to an external force, which enables the first body and the second body firmly joined with each other without easily getting loose.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An electronic device, comprising:
a first body, having a lock portion; and
a second body, comprising:
a main body, configured to be detachably assembled to the first body;
a lock component, movably disposed in the main body;
an actuator, disposed in the main body; and
a retainer, connected to the actuator, wherein when the main body is detachably assembled to the first body and the lock component is located at a first position, the lock component locks the lock portion to prevent the main body being separated from the first body, and then the actuator drives the retainer pushing the lock component so as to prevent the lock component departing from the first position.

2. The electronic device as claimed in claim 1, wherein the second body further comprises an elastic component connected between the main body and the lock component, and the lock component is configured to be positioned at the first position through an elastic force of the elastic component.

3. The electronic device as claimed in claim 2, wherein when the lock component departs from the first position through withstanding the elastic force of the elastic component, the lock component releases the lock portion and the main body is suitable to be detached from the first body.

4. The electronic device as claimed in claim 1, wherein the retainer is configured to push a first surface of the lock component to prevent the lock component departing from the first position, and the actuator is configured to drive the retainer departing from the first surface of the lock component and pushing a second surface of the lock component so as to bring the lock component moving to a second position to release the lock portion.

5. The electronic device as claimed in claim 4, wherein the lock component has an opening, and the first surface and the second surface are respectively located at opposite two inner-walls of the opening.

6. The electronic device as claimed in claim 5, wherein the retainer has a protrusion portion, and the protrusion portion is located in the opening to be adapted to push the first surface or the second surface.

7. The electronic device as claimed in claim 6, wherein distance between the first surface and the second surface is greater than a thickness of the protrusion portion.

8. The electronic device as claimed in claim 1, wherein the actuator is a motor.

9. The electronic device as claimed in claim 1, wherein the main body has a sensing component electrically connected to the actuator, and when the sensing component senses the main body is connected to the first body, the actuator drives the retainer according to a signal come from the sensing component.

* * * * *